(12) United States Patent
Curtis et al.

(10) Patent No.: US 8,393,346 B2
(45) Date of Patent: Mar. 12, 2013

(54) SOLENOID VALVE AND METHOD OF ASSEMBLY THEREOF

(75) Inventors: Douglas Allan Curtis, Statesville, NC (US); Donald Edwin Hargraves, Huntersville, NC (US); Linnea M. Hargraves, legal representative, Huntersville, NC (US); Nathan Horst Davis, Cornelius, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 1032 days.

(21) Appl. No.: 11/573,511

(22) PCT Filed: Aug. 12, 2005

(86) PCT No.: PCT/US2005/028947
§ 371 (c)(1),
(2), (4) Date: Sep. 11, 2009

(87) PCT Pub. No.: WO2006/020964
PCT Pub. Date: Feb. 23, 2006

(65) Prior Publication Data
US 2009/0321671 A1    Dec. 31, 2009

Related U.S. Application Data

(60) Provisional application No. 60/600,978, filed on Aug. 12, 2004.

(51) Int. Cl.
*F16K 43/00* (2006.01)
*F16K 31/06* (2006.01)
*F16K 31/02* (2006.01)

(52) U.S. Cl. ............ 137/15.18; 137/625.65; 251/129.18

(58) Field of Classification Search ............. 137/625.65, 137/625.67, 15.18; 335/296, 297, 299; 251/129.18
See application file for complete search history.

(56) References Cited

U.S. PATENT DOCUMENTS

| | | | | | |
|---|---|---|---|---|---|
| 4,102,526 | A | * | 7/1978 | Hargraves | 251/129.21 |
| 4,327,772 | A | * | 5/1982 | Kawabata | 137/625.48 |
| 4,538,645 | A | * | 9/1985 | Perach | 137/625.65 |
| 4,611,631 | A | * | 9/1986 | Kosugi et al. | 137/625.65 |
| 4,624,285 | A | * | 11/1986 | Perach | 137/625.65 |
| 5,150,602 | A | * | 9/1992 | Payne et al. | 29/623.2 |
| 5,162,767 | A | * | 11/1992 | Lee et al. | 335/255 |
| 5,197,507 | A | * | 3/1993 | Miki et al. | 137/1 |
| 5,289,841 | A | * | 3/1994 | Maranzano | 137/1 |
| 5,412,869 | A | * | 5/1995 | Boltz et al. | 29/890.032 |

(Continued)

FOREIGN PATENT DOCUMENTS

JP    07-280109    10/1995
JP    07280109 A  * 10/1995

*Primary Examiner* — Eric Keasel
*Assistant Examiner* — Kevin Barss
(74) *Attorney, Agent, or Firm* — Shumaker, Loop & Kendrick, LLP

(57) ABSTRACT

A valve assembly includes a housing having a valve bore, a valve seat, and at least one port communicating with the bore. A moveable plunger resides in the valve bore and selectively seals against the valve seat. A bobbin integral with the housing has a solenoid bore adjacent to and coaxial with the valve bore. A moveable armature resides in the solenoid bore and has an operating rod connected to the plunger. A pole piece resides in the solenoid bore adjacent the armature. A solenoid coil is wound about the bobbin. A flux conductor partially surrounding the bobbin, pole piece, and armature. An assembly method includes flowing air through the port, inserting the plunger or another sealing element into the bore while monitoring the fluid flow; and stopping the plunger or sealing element when the flow is at a preselected condition.

4 Claims, 17 Drawing Sheets

U.S. PATENT DOCUMENTS

| | | | | |
|---|---|---|---|---|
| 5,441,233 A | * | 8/1995 | Asou et al. | 251/129.15 |
| 6,425,409 B1 | * | 7/2002 | Cross et al. | 137/15.18 |
| 6,698,713 B2 | * | 3/2004 | Sato et al. | 251/129.15 |
| 6,745,465 B1 | * | 6/2004 | Shinogle et al. | 29/888.01 |
| 2002/0079005 A1 | * | 6/2002 | Yoshida et al. | 137/625.65 |
| 2003/0102453 A1 | * | 6/2003 | Fukano et al. | 251/129.15 |

* cited by examiner

SOLENOID VALVE AND METHOD OF ASSEMBLY THEREOF

BACKGROUND OF THE INVENTION

This invention relates generally to valves and more particularly to a solenoid operated poppet valve.

Fluid flow systems often utilize one or more valves to control the flow of fluid therethrough. One particular kind of valve is a "poppet" valve. A poppet refers to the mating of a seat feature and a seal feature. When the two features are forced against each other, the result is a blockage that prohibits the flow of a fluid through a pathway. When the features are separated, the pathway is opened, allowing the fluid to flow freely.

Poppet valves are often operated by a solenoid including a coil which creates a magnetic field when electrically charged. The magnetic field creates a force that causes components to move causing separation of the seal and the seat, thereby activating the valve.

While they are required elements in most fluid flow systems, valves are also the source of losses and excess energy consumption in these systems. For example, the fluid flow through the valve body and poppet experiences pressure losses as compared to a straight tube or pipe.

The solenoid may also be the cause of inefficiencies. If the solenoid coil induces more flux energy than the magnetic circuit can convert to mechanical force, saturation will occur and power going into the coil will be wasted. This condition will also generate excess heat. On the opposite extreme, if the coil is not large enough, the full potential of the magnetic circuit will not be achieved and the overall valve will have very limited capabilities.

Accordingly, there is a need for a solenoid valve which operates efficiently both electrically and fluidically.

BRIEF SUMMARY OF THE INVENTION

Therefore, it is an object of the invention to provide a combination valve and solenoid.

It is another object of the invention to provide a solenoid valve have increased electrical operating efficiency.

It is another object of the invention to provide a solenoid valve having increased fluid efficiency.

It is yet another object of the invention to provide a method for assembling a valve which compensates for manufacturing tolerances of the various components.

These and other objects are met by the above-mentioned need is met by the present invention, which according to one embodiment provides valve assembly, including: an elongated valve body defining: an integral valve housing having a valve bore, a proximate valve seat, and at least one port disposed in fluid communication with the bore; a moveable plunger disposed in the valve bore and adapted to selectively seal against the valve seat; and a generally cylindrical bobbin defining a solenoid bore disposed adjacent to and coaxial with the valve bore. A moveable, magnetically permeable armature is disposed in the solenoid bore and has an operating rod which extends into the valve bore and is connected to the plunger. A magnetically permeable pole piece is disposed in the solenoid bore adjacent the armature. A solenoid coil is wound about an exterior of the bobbin; and a flux conductor partially surrounds the bobbin, the pole piece, and the armature.

According to another embodiment of the invention, valve bore is open-ended, and further includes an end cap received in the bore which defines a distal valve seat opposite the proximate valve seat.

According to another embodiment of the invention, the valve assembly further includes: first, second, and third ports in fluid communication with the valve bore, wherein the first and third ports, are disposed on opposite sides of the distal valve seat, and the second and third ports are disposed on opposite sides of the proximate valve seat.

According to another embodiment of the invention, the flux conductor includes: a longitudinal portion; a first end wall extending radially from the longitudinal portion and having a first cutout disposed between a first pair of radially-extending legs, the first cutout surrounding the pole piece. A second end wall extends radially from the longitudinal portion and has a second cutout disposed between a second pair of radially-extending legs. The second cutout surrounds the armature.

According to another embodiment of the invention, the valve assembly further includes a filler piece disposed in the second cutout, such that the second end wall effectively encircles the entire perimeter of the armature.

According to another embodiment of the invention, the filler piece is secured to the second end wall by crimping the second pair of legs around the filler piece.

According to another embodiment of the invention, a ratio of a longitudinal length of the coil to a cross-sectional area of the coil is 11:1 to about 15:1.

According to another embodiment of the invention, the ratio of the longitudinal length of the coil to the cross-sectional area of the coil is at least about 13:1.

According to another embodiment of the invention, a ratio a cross-sectional area of the coil a cross-sectional area of the armature is about 2:1 to about 3:1.

According to another embodiment of the invention, the ratio of the cross-sectional area of the coil to a cross-sectional area of the armature is at least about 2.4 to 1.

According to another embodiment of the invention, a solenoid includes: a generally cylindrical bobbin defining a solenoid bore; a moveable, magnetically permeable armature disposed in the solenoid bore and having an operating rod extending therefrom; a magnetically permeable pole piece disposed in the solenoid bore adjacent the armature; a solenoid coil wound about an exterior of the bobbin; and a flux conductor partially surrounding the bobbin, the pole piece, and the armature.

According to another embodiment of the invention, a method of assembling a valve includes: providing a valve housing having a bore therein, and at least one port in flow communication with the bore; providing at least one sealing element receivable in the bore, wherein the position of the element affects the flow through the port; flowing air through the port; inserting the sealing element into the bore while monitoring the fluid flow; and stopping the sealing element when the flow is at a preselected condition.

According to another embodiment of the invention, a method of assembling a valve includes: providing a valve housing having: an open-ended bore; first, second, and third ports disposed in flow communication with the bore; and first valve seat disposed between the second port and the third port. An end cap is provided which is adapted to be received in the bore and defining a second valve seat disposed between the first port and the third port; An operating rod is disposed in the bore and moveable between a first position adjacent the first valve seat, and a second position away from the first valve seat; a plunger is adapted to fit in the bore and be attached to the operating rod. The plunger has: a first seal adapted to engage the first valve seat; and a second seal adapted to engage the second valve seat. The operating rod is moved to the first position a first flow of fluid is created through the third port; The plunger is inserted into the bore and moved towards the first seat while monitoring a flow rate of the first flow. The plunger is stopped at a position where the first flow is terminated; and the plunger is secured to the operating rod.

According to another embodiment of the invention, the method further includes: after stopping the plunger at a position where the first flow is terminated, continuing to move the plunger towards the seat until the first seal is compressed to a selected degree.

According to another embodiment of the invention, the method further includes: creating a second flow of fluid through the first port; inserting the end cap into the bore and moving the end cap towards the first seat while monitoring a flow rate of the second flow; stopping the end cap at a position where the second flow equals a predetermined value; and securing the end cap to the valve housing.

According to another embodiment of the invention, the method further includes: moving the plunger against the second valve seat; creating a third flow of fluid through the second port; inserting the end cap into the bore and moving the end cap towards the first seat while monitoring a flow rate of the third flow; stopping the end cap at a position where the third flow equals a predetermined value; and securing the end cap to the valve housing.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 3:
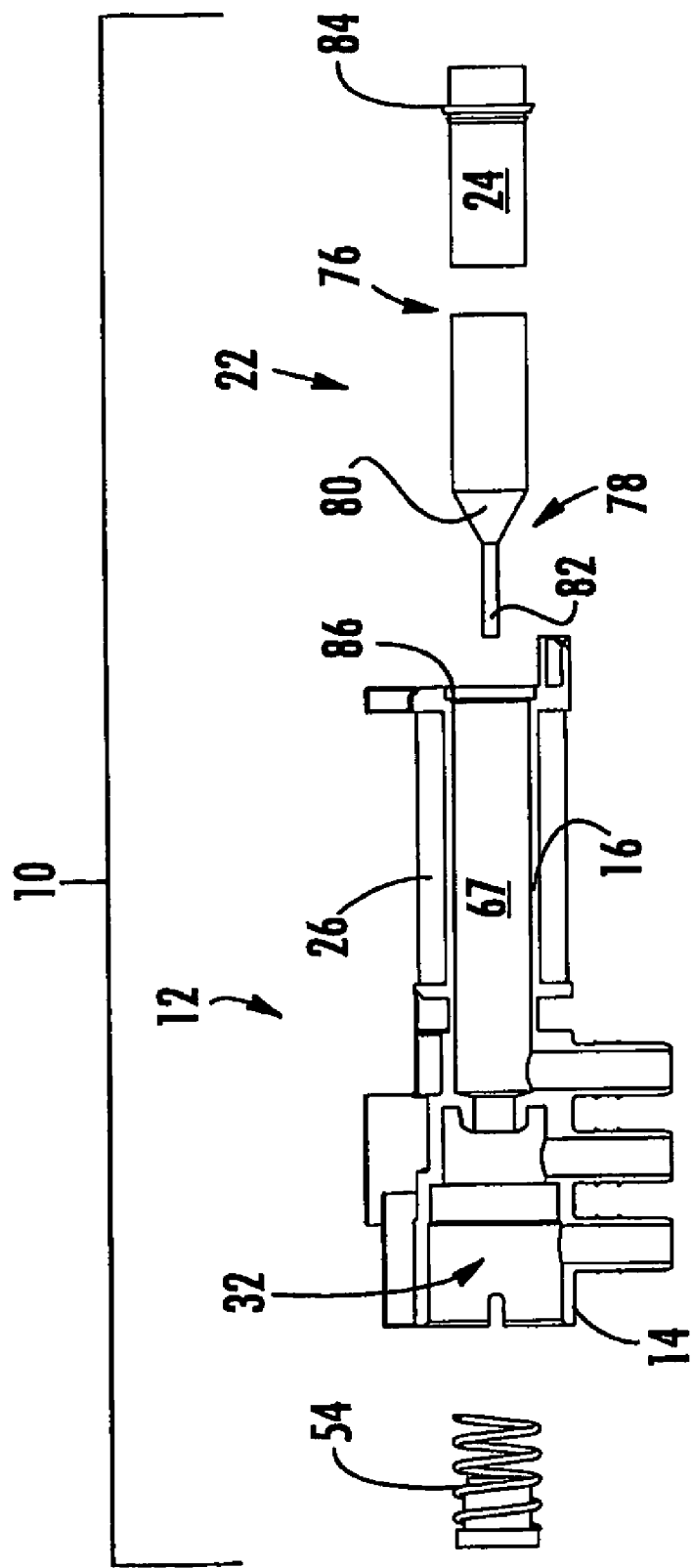
FIG. 3 is an exploded cross-sectional view of a portion of the valve assembly of FIG. 1.
Figure 4:
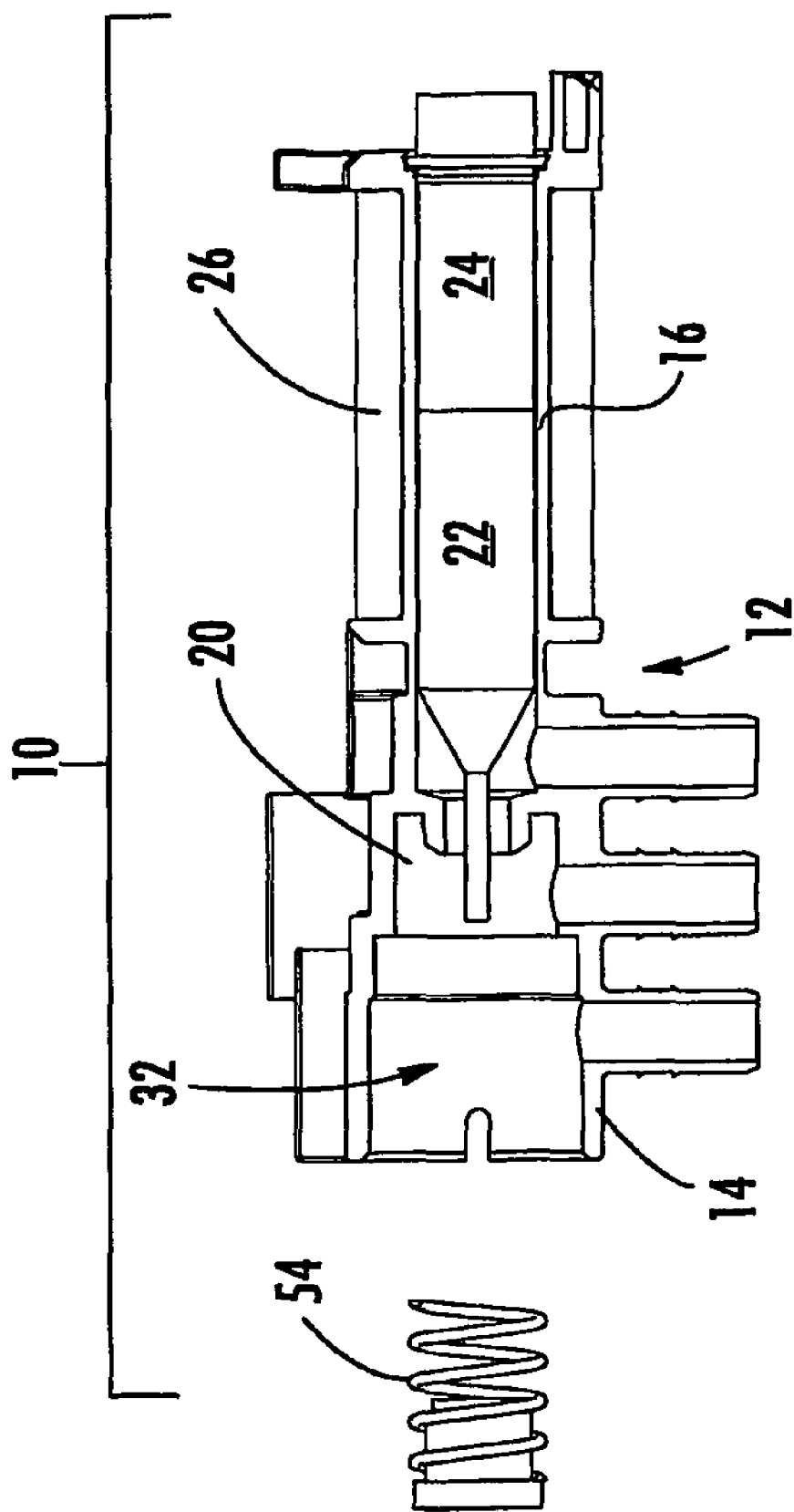
FIG. 4 is a cross-sectional view of the valve assembly of FIG. 3 in a partially assembled condition.
Figure 5:
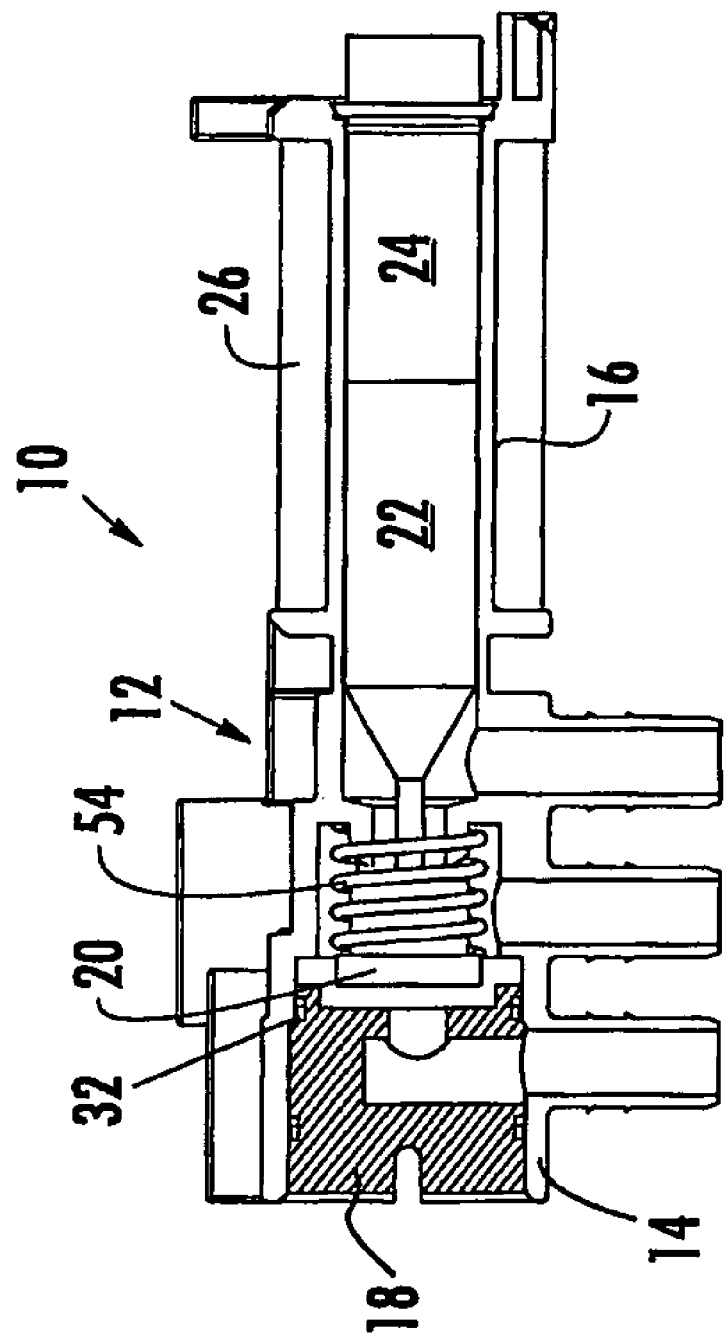
FIG. 5 is a cross-sectional view of the valve assembly of FIG. 3 in an assembled condition.

Referring to the drawings wherein identical reference numerals denote the same elements throughout the various views, FIGS. 1-5 illustrate an exemplary valve assembly 10 constructed in accordance with the present invention. The basic components of the valve assembly are a valve body 12 defining a housing 14 and a bobbin 16, an end cap 18, a plunger 20, a spring 54, an armature 22, a pole piece 24, a coil 26, and a flux conductor 28. The internal components each slide or are pressed into the valve body 12, as shown in FIGS. 3 and 4. The bobbin 16, armature 22, pole piece 24, coil 26, and flux conductor 28, collectively form a solenoid 30.

The housing 14 includes a valve bore 32 having a first end 34 and a second end 36 which receives the plunger 20. A "normally closed" first or distal valve seat 38 is formed at the first end of the valve bore 32, and a "normally open" second or proximate valve seat 40 is formed at the second end 36 of the valve bore 32. The plunger 20 carries resilient first and second seals 42 and 44 on opposed faces thereof. In the illustrated example, the first and second seals 42 and 44 are through-molded to the plunger 20 as a single piece and are connected to each other by a neck 46 which extends through a central opening 48 in the plunger 20.

Figure 1:
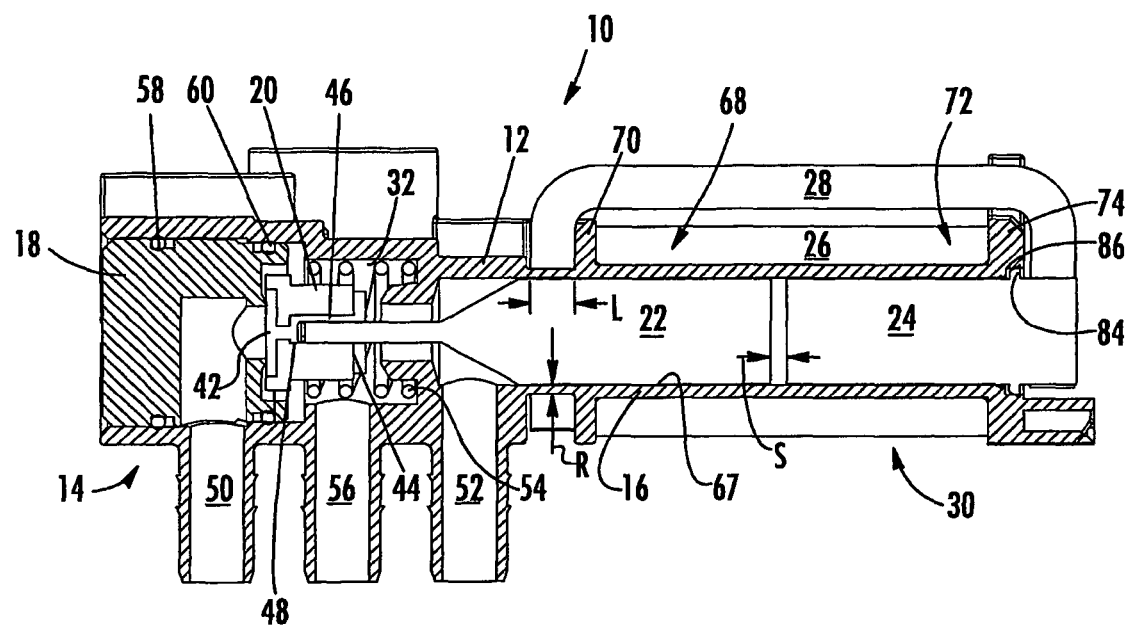
FIG. 1 is a side cross-sectional view of a valve assembly constructed in accordance with the present invention.
Figure 2:
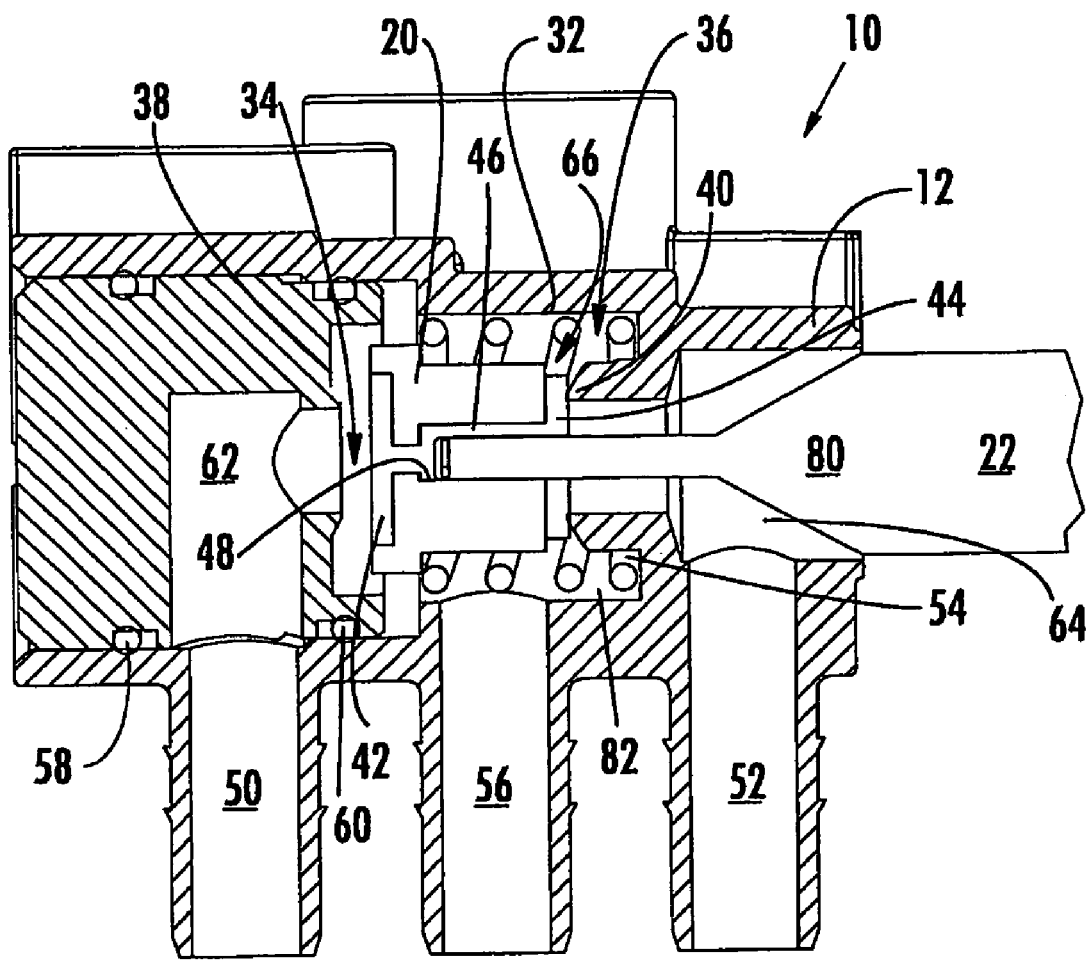
FIG. 2 is a partial cross-sectional view of the valve shown in FIG. 1, in an activated position.

The plunger 20 is slidably mounted in the valve bore 32 such that the first seal 42 contacts the first valve seat 38 when the plunger 20 is positioned at the first end 34 of the valve bore 32, and the second seal 44 contacts the second valve seat 4Q when the plunger 20 is positioned at the second end 36 of the valve bore 32. A first port 50 is disposed in fluid communication with the first valve seat 38, and a second port 52 is disposed in fluid communication with the second valve seat 40. Biasing means such as spring 54 may be provided to urge the plunger 20 towards the first end 34. Thus, when the valve is not activated, the first port 50 is "normally closed" and the second port 52 is "normally open". A common port 56 is disposed such that it is in fluid communication with either the first port 50 or the second port 52 depending upon the position of the plunger 20. In FIG. 1, the first port 50 is closed off and the common port 56 is in flow communication with the second port 52, while in FIG. 2 the second port 52 is closed off and the common port 56 is in flow communication with the first port 50.

In the illustrated example, the end cap 18 forms part of the housing 14. The end cap 18 is generally cylindrical and has features formed therein which define the first valve seat 38 and a portion of the first port 50. The end cap 18 is slidably received in the first end 34 of the valve bore 32 and is appropriately sealed against leakage, for example by first and second O-rings 58 and 60.

The valve assembly 10 includes several features to improve the flow efficiency therethrough. The fluidic performance capability of a valve is generally controlled by the area, or "orifice" of the smallest section of the flow path that the fluid travels through. This area is defined as the valve orifice or "measured" orifice. This limiting section could potentially be located anywhere within the flow path.

The valve assembly 10 is designed such that the measured orifice is substantially the same for the first, second, and common ports 50, 52, and 56, respectively, so as not to create disproportionate performance characteristics for the different pathways.

The valve assembly 10 is designed with the shortest internal flow paths possible. This is done by placing the first, second, and common ports 50, 52, and 56 on the same end of the valve assembly 10 and by keeping the distance between the ports as small as possible.

The valve assembly 10 also incorporates the largest possible area in all fluid pathways. The valve assembly 10 has a preselected nominal measured orifice size, i.e. a design point diameter, which in this example is 1.9 mm (0.075 in.) The various fluid pathways have a flow area that matches the measured orifice size only where required by the design, i.e., at entrances of the first, second, and common ports 50, 52, and 56. At all other points, the pathways are greater in flow area than the measured orifice. For example, each of the first, second, and common ports has an added volume associated therewith formed in the housing 14. These volumes are labeled 62, 64, and 66, respectively. These added volumes ensure that the "effective" orifice, which is affected by loss-causing features, is as close as possible to the measured orifice, for each flowpath.

The bobbin 16 is an elongated structure that is integrally formed with the housing 14. The bobbin 16 defines a solenoid bore 67 and has a first end 68 disposed next to the second end 36 of the valve bore 32 which carries an outwardly-extending first flange 70, and a spaced-apart second end 72 which carries an outwardly-extending second flange 74.

The conductive armature 22, made of a suitable magnetically permeable material such as steel, is disposed inside the solenoid bore 67. The armature 22 is generally cylindrical and has a first end 76 which is flat-faced and a second end 78 which includes a tapered section 80 and an operating rod 82. The operating rod 82 is connected to the plunger 20 such that motion of the armature 22 is transferred to the plunger 20. In the illustrated example, the operating rod 82 is received in the central opening 48 of the plunger 20 and secured thereto by an interference fit, which may be facilitated by providing outwardly-extending barbs (not shown) disposed on the operating rod 82.

The conductive pole piece 24, also made of a suitable magnetically permeable material such as steel, is disposed inside the solenoid bore 67 near the second end 72 of the bobbin 16. In the illustrated example, the pole piece 24 is generally cylindrical with flat-faced ends, and is secured to the bobbin 16 by a tapered annular ridge 84 formed thereon which engages a groove 86 in the solenoid bore 67.

The coil 26 which comprises multiple turns of wire is wound about the exterior of the bobbin 16 between the first flange 70 and the second flange 74. Suitable means of a known type (not shown) are provided for connecting the coil to a source of electrical power. A ratio of coil length to cross-sectional area in the range of about 11:1 to about 15:1, preferably at least 13:1, combined with a ratio of coil cross-sectional area to pole or armature cross-sectional area in the range of about 2:1 to about 3:1, and preferably at least 2.4:1, has been found to give an efficiently design which fits within the package width of a 10 mm nominal size valve assembly 10.

When assembled, there is a radial gap "R" present between the outer surface of the armature 22 and the flux conductor 28. The bobbin 16, which has essentially the same magnetic permeability as air, fills this radial gap R. There is also a "stroke gap", denoted "S", between the ends of the armature 22 and the pole piece 24 when the coil 26 is not energized.

The flux conductor 28 partially surrounds the bobbin 16, pole piece 24, and armature 22. The flux conductor 28 is preferably made from a material of high magnetic permeability. One suitable material is a high iron-based steel. It is preferred that the flux conductor 28 to have the least contribution to the overall magnetic system reluctance relative to the remainder of the components within the solenoid 30.

The radial gap "R", and therefore any magnetic flux losses therethrough, is minimized by providing the bobbin 16 with a very thin wall section located where the radial gap R is located. For example, the wall thickness may be about 0.33 mm (0.013 in.) To accomplish this, a material is used which meets the structural and thermal requirements for the valve assembly 10 and is also able to be molded to very thin wall thicknesses. A non-limiting example of a suitable material is a blend of PolyPhenylene Ether Co-polymer (PPE) and Polyamide (PA) plastic resin.

The area of the radial gap R that the flux conductor 28 covers is controlled by the thickness of the material used for the flux conductor 28 and the amount of the circumference that the flux conductor 28 extends over. For the illustrated valve assembly having a nominal 1.9 mm (0.075 in.) orifice diameter, the flux conductor 28 may be about 1.57 mm (0.062 in.) thick, thus covering that much of the longitudinal length "L" of the radial gap R.

The thickness of the flux conductor 28 drives how much area can be made available for the flux path both through the flux conductor 28 and at the radial gap R. The valve assembly 10 in the illustrated example has a ratio of the thickness of the flux conductor 28 relative to the area of the pole 24 and armature 22 of about 3.5 to 1, which is far greater than for prior art solenoids of this type.

To achieve full coverage of the perimeter of the radial gap R, the flux conductor 28 is fabricated in two sections that, when assembled, will cover the full 360° of the radial gap R.

Figure 6:
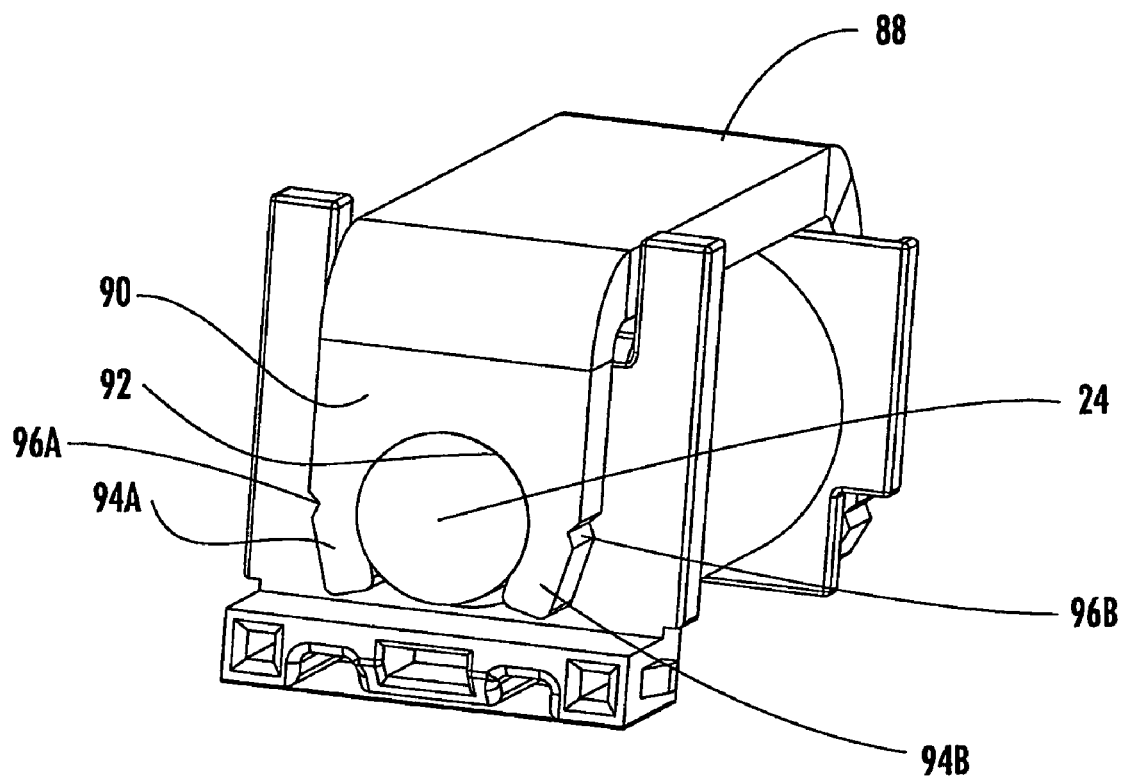
FIG. 6 is a perspective view of a portion of the valve assembly of FIG. 1.
Figure 7:
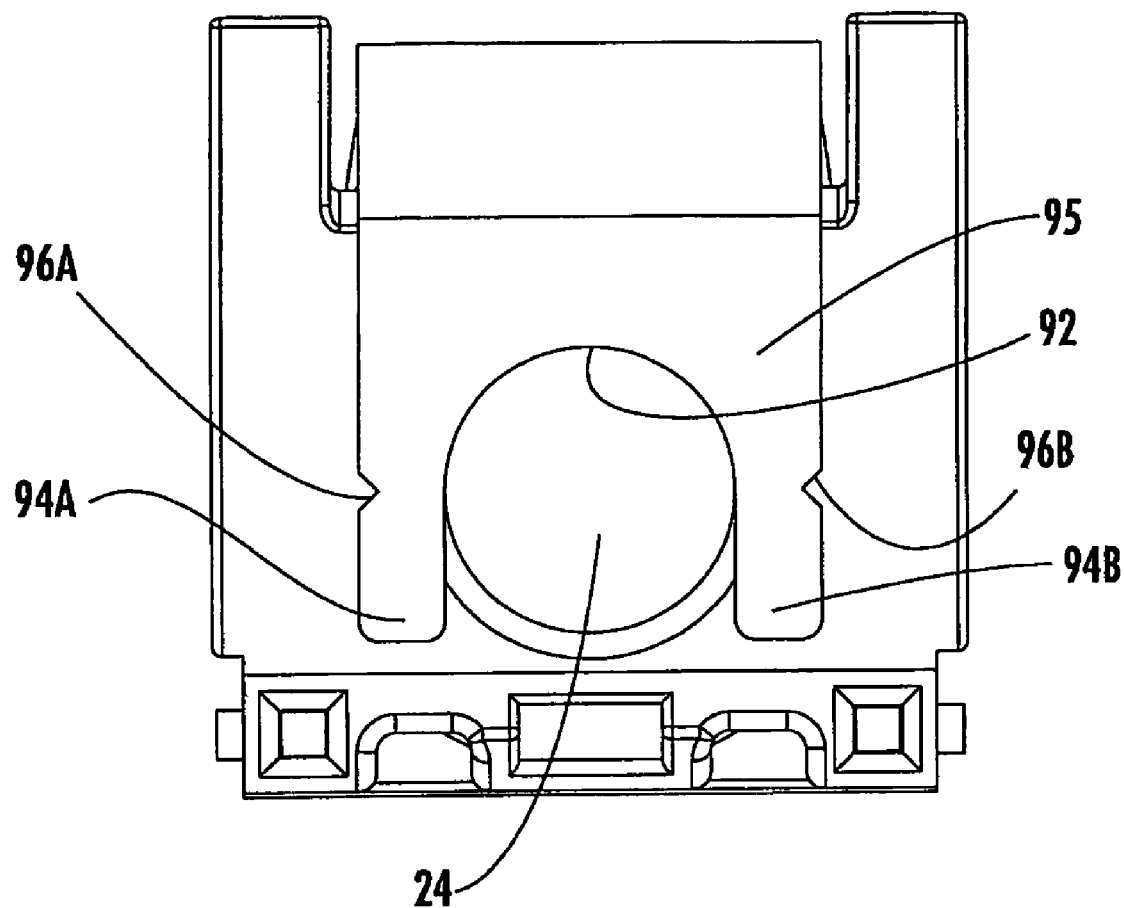
FIG. 7 is an end view of the valve assembly shown in FIG. 6, shown a pre-assembly condition.
Figure 8:
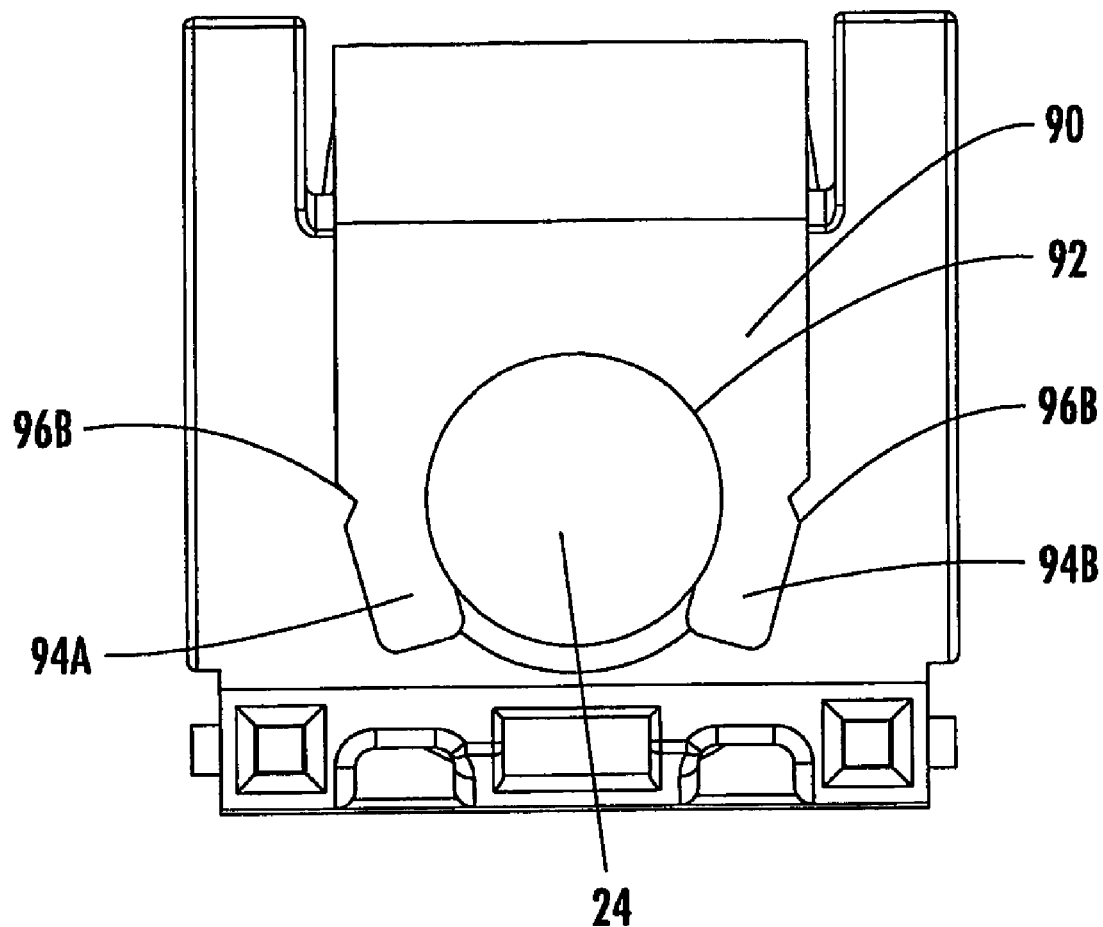
FIG. 8 is an end view of the valve assembly shown in FIG. 6 after a crimping operation has been completed.

FIG. 6 depicts the solenoid portion of the valve assembly 10 and illustrates how the flux conductor 28 is secured to the bobbin 16. The flux conductor 28 has a longitudinal portion 88 and a first end wall 90 which extends downward from the longitudinal portion 88 in a radial direction. The first end wall 90 has a first cutout 92 formed between a first pair of legs 94A and 94B. The first end wall 90 is assembled to the pole piece 24 by placing the first cutout 92 down over the perimeter of the pole piece 24 as shown in FIG. 7. The legs 94A and 94B are then crimped inward to firmly clamp the pole piece 24, as shown in FIG. 8. The crimping process is facilitated by a pair of notches 96A and 96B which are formed respectively in the legs 94A and 94B.

Figure 9:
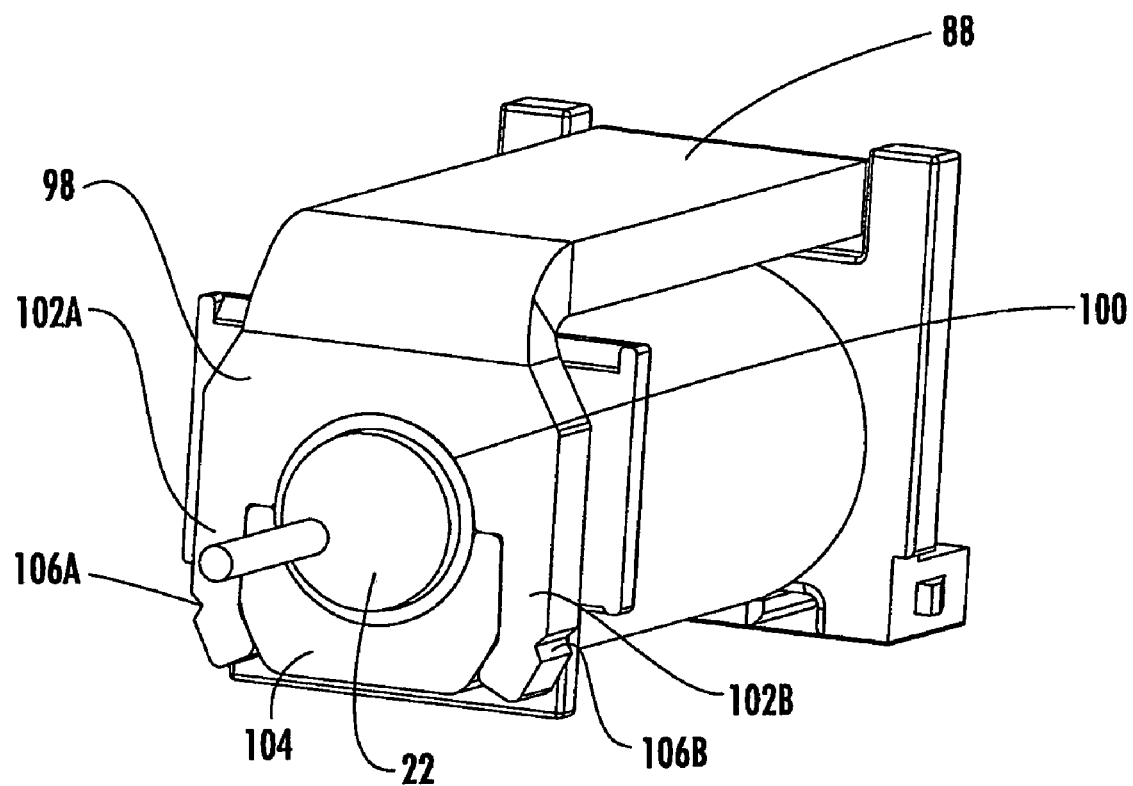
FIG. 9 is another perspective view of a portion of the valve assembly of FIG. 1.
Figure 10:
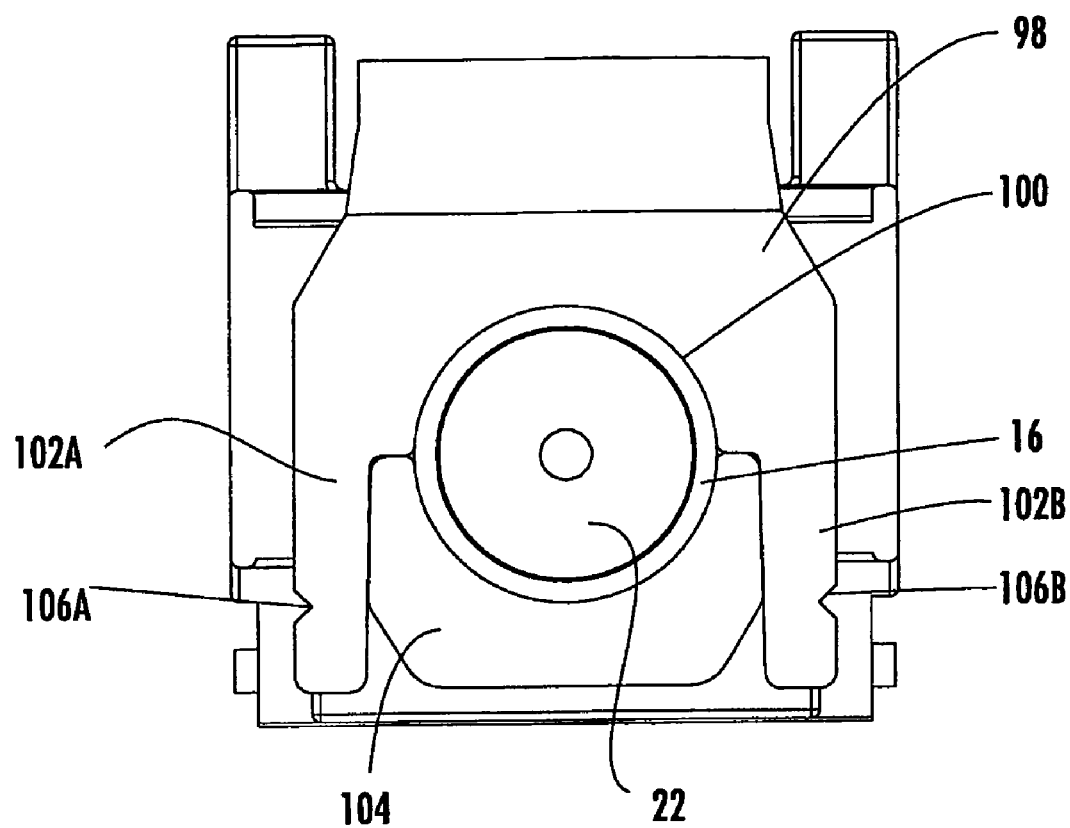
FIG. 10 is an end view of the valve assembly shown in FIG. 9, shown a pre-assembly condition.
Figure 11:
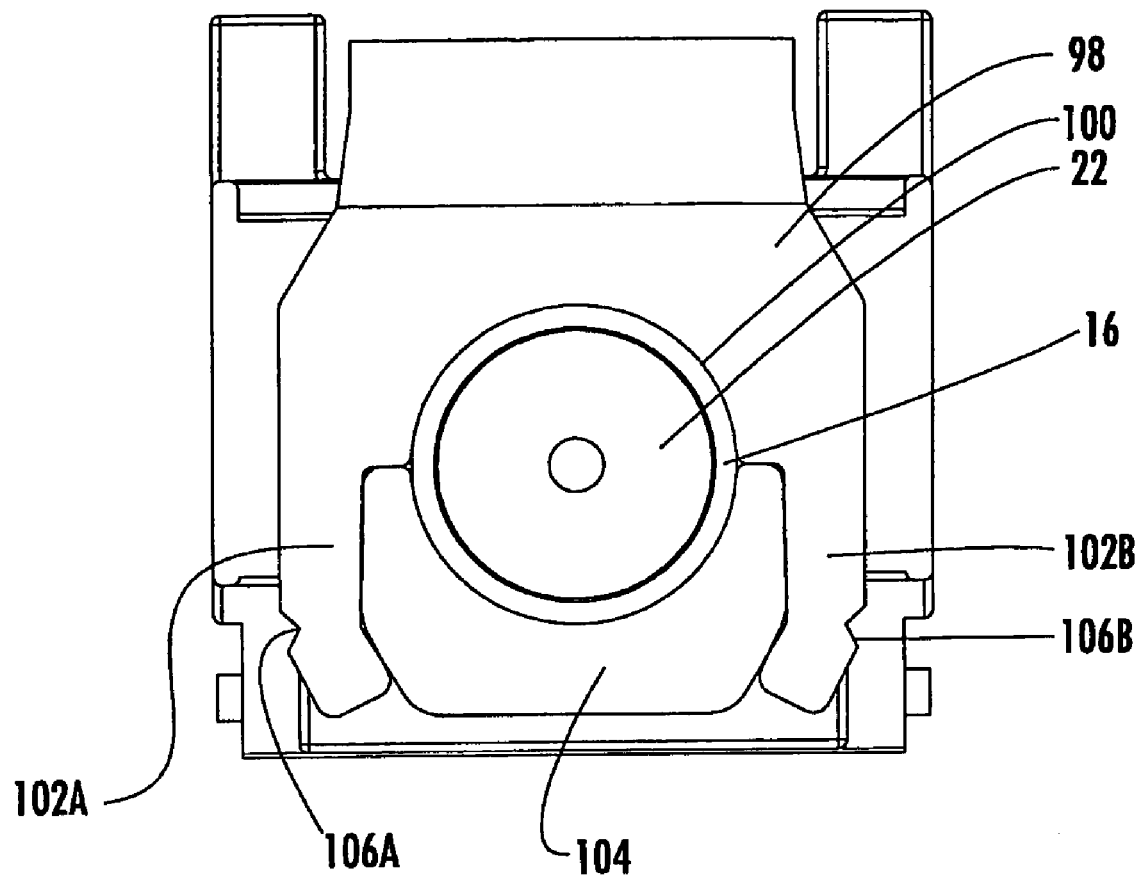
FIG. 11 is an end view of the valve assembly shown in FIG. 9 after a crimping operation has been completed.

FIG. 9 depicts the opposite end of the solenoid portion of the valve assembly 10 and further illustrates how the flux conductor 28 is secured to the bobbin 16. The flux conductor 28 has a second end wall 98 which extends downward from the longitudinal portion 88 in a radial direction. The second end wall 98 has a second cutout 100 formed between a second pair of legs 102A and 102B. The second end wall 98 is assembled to the first end 68 of the bobbin 16 by placing the second cutout 100 down over the perimeter of the first end 68 of the bobbin 16 as shown in FIG. 10. A filler piece 104 is placed underneath the bobbin 16 and between the second pair of legs 102A, 102B The legs 102A and 102B are then crimped inward to firmly clamp the filler piece 104 and the bobbin 16, as shown in FIG. 11. The crimping process is facilitated by a pair of notches 106A and 106B which are formed respectively in the legs 102A and 102B.

When assembled as described above, the mean diameter of the radial gap R is about 4.2 mm (0.164 in.) This generates a flux path area of about 20.6 mm$^2$ (0.032 in.$^2$) which is almost twice as much as the area of the flux path found at the pole piece 24 and armature 22. This gives a ratio of 1.8:1 of the flux path area of the radial gap R relative to the stroke gap S. The larger this ratio, the better the efficiency, and preferably this ratio is about 1.6:1 or greater.

Because solenoid valves are constructed of several components, the stack-up of tolerances of these components will have a distinct effect on the fluidic performance of the valve. This effect will be a considerable variance in the fluidic flow capacity of the valve. The quantity and construction of components used in the design of the valve will have a direct impact on the magnitude of this effect. The greater the number of components, the greater the stack-up of tolerances will be. Additionally, the less precise the method of fabrication, the greater the variances will be and the greater the effect on the fluidic flow.

Accordingly, the valve assembly 10 may be assembled by a method that removes virtually all effect of the tolerance stack-up of the components and of the inherent variances produced by the assorted fabrication methods. By applying a fluidic source to the valve and actively monitoring the fluidic flow during the assembly process, any performance characteristic associated with that level of assembly can be monitored and is used to confirm correct assembly position of the components being installed. This method allows a precise flow to be achieved limited in accuracy only by the gauging used to measure the flow.

Figure 12:
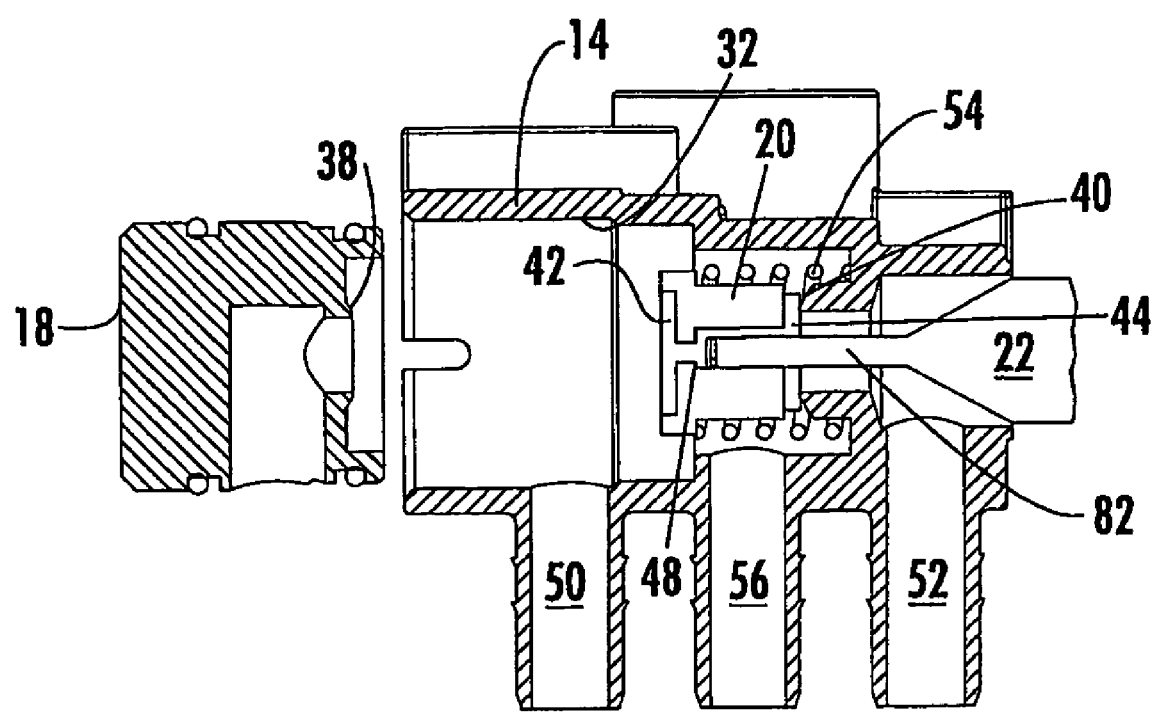
FIG. 12 is an exploded cross-sectional view of a portion of the valve assembly of FIG. 1 showing a first method of assembly.
Figure 13:
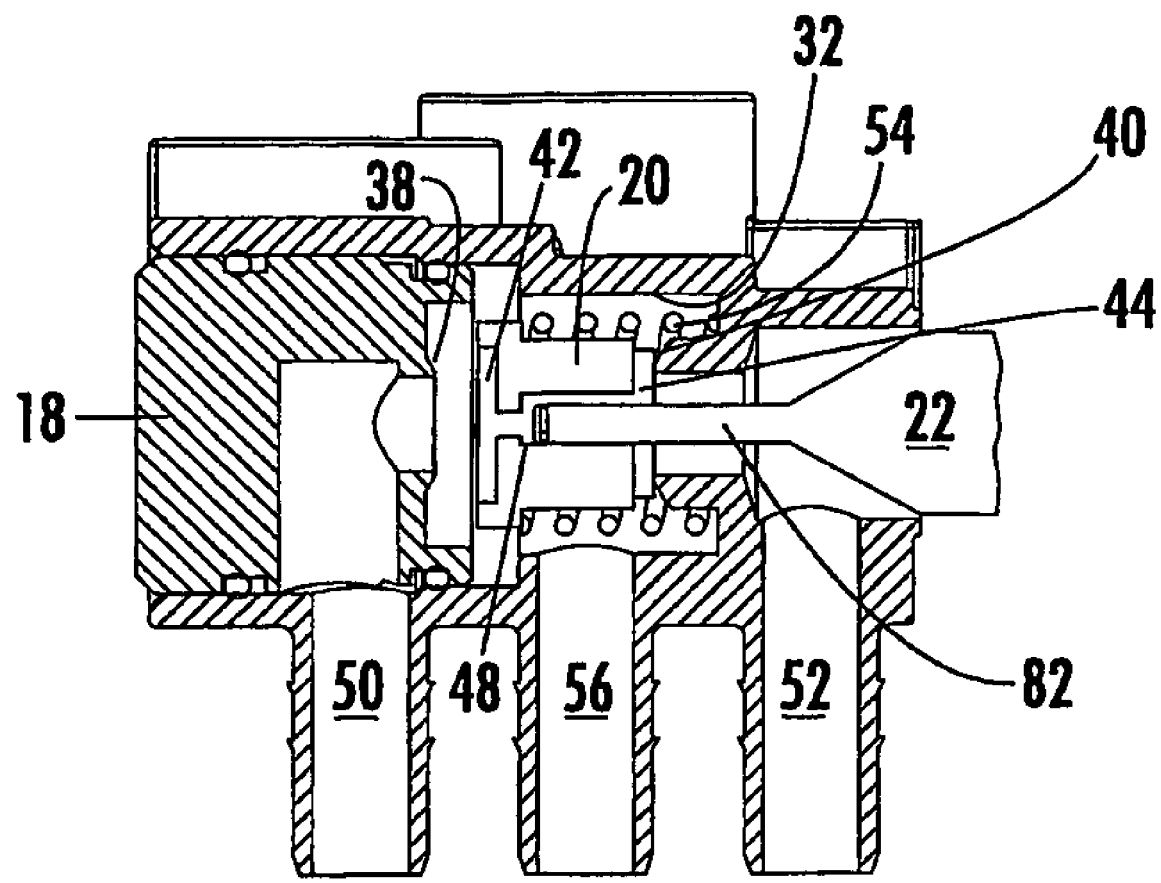
FIG. 13 is another view of the valve assembly of FIG. 12 showing an end cap partially installed therein.
Figure 14:
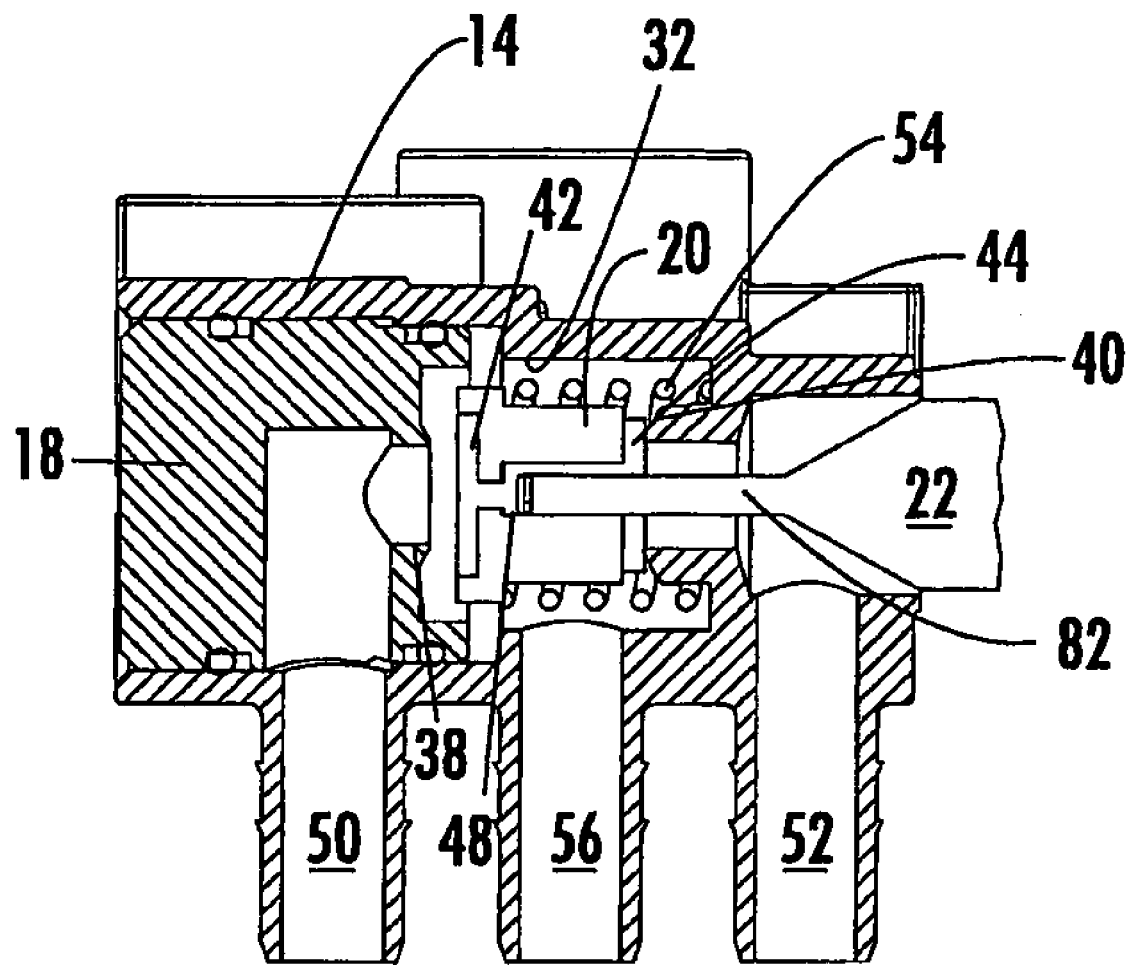
FIG. 14 is another view of the valve assembly of FIG. 12 showing an end cap locked into position therein.

The assembly method is illustrated in FIGS. 12-14. The plunger 20 with first and second seals 42 and 44 and spring 54 is installed directly to the operating rod 82 of the armature 22 that has already been assembled with the valve body 12. When the plunger 20 is inserted into the valve bore 32, the armature 22 is forced into the "activated" (i.e. coil energized) position. During the installation of the plunger 20, a regulated air source (not shown) is connected to the second (i.e. normally open) port 52. The plunger 20 with first and second seals 42 and 44 and spring 54 is then inserted in place to what will be the activated position and assembled to the point that the airflow through the second port 52 is completely stopped. At this point, the second seal 44 is pressed against the second valve seat 40 to a level that inhibits a set airflow. Depending on the planned valve configuration, the plunger 20 is inserted some amount further to force a certain percentage of compression against the second seal 44. This allows for future compression set that may be seen in the resilient second seal 44.

Next, the end cap 18, which contains the first (normally closed) valve seat 38, is inserted to a particular depth that is known to be less than its optimal position range, as shown in FIG. 13. A regulated air source (not shown) is connected to the first (normally closed) port 50 while a calibrated flow meter (also not shown) is connected to the common port 56. The armature 22 is forced to its activated position so that the first port 50 is opened creating a clear flowpath to common port 56 thus allowing airflow through the valve assembly 10 that is measured by the flow meter.

The end cap 18 is then inserted further into position while the airflow is being monitored, as shown in FIG. 14. Once a target airflow for the desired configuration is achieved, the end cap 18 is permanently secured in place by a known method, for example by using fasteners, adhesives, staking, crimping, or the like.

Figure 15:
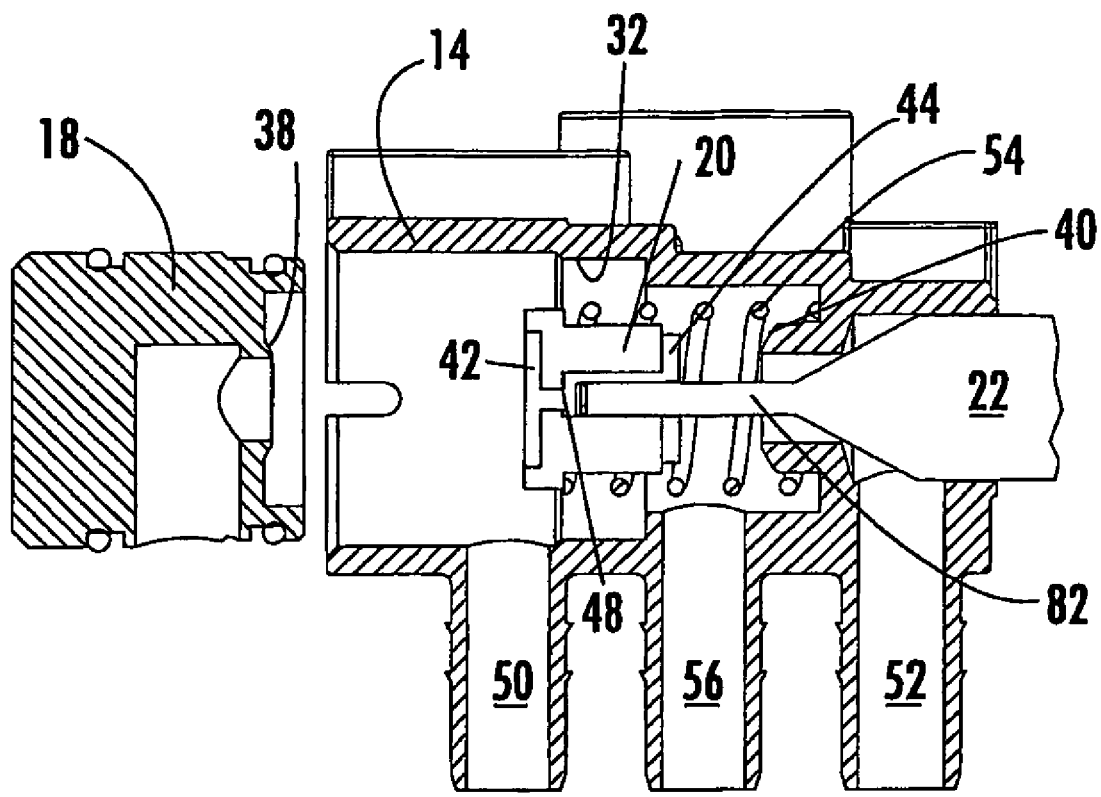
FIG. 15 is an exploded cross-sectional view of a portion of the valve assembly of FIG. 1 showing an alternate method of assembly.
Figure 16:
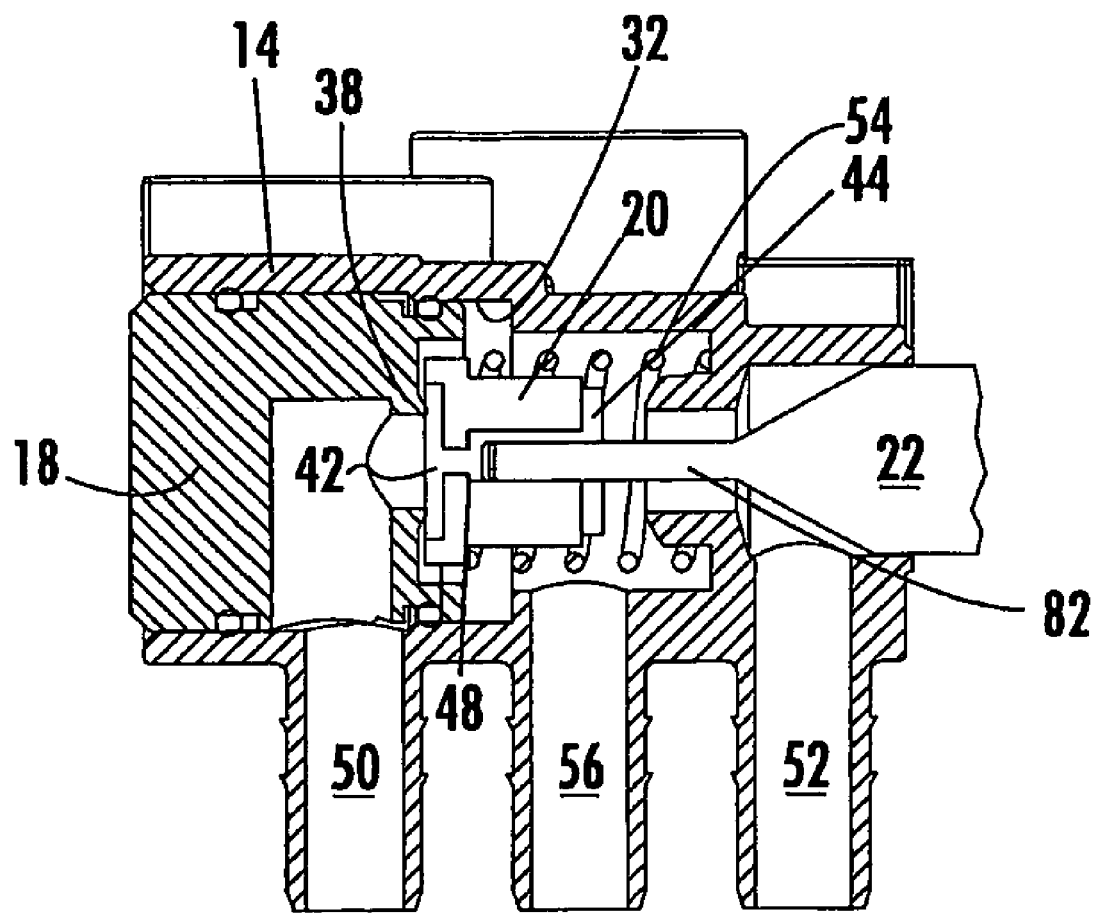
FIG. 16 is another view of the valve assembly of FIG. 15 showing an end cap partially installed therein.
Figure 17:
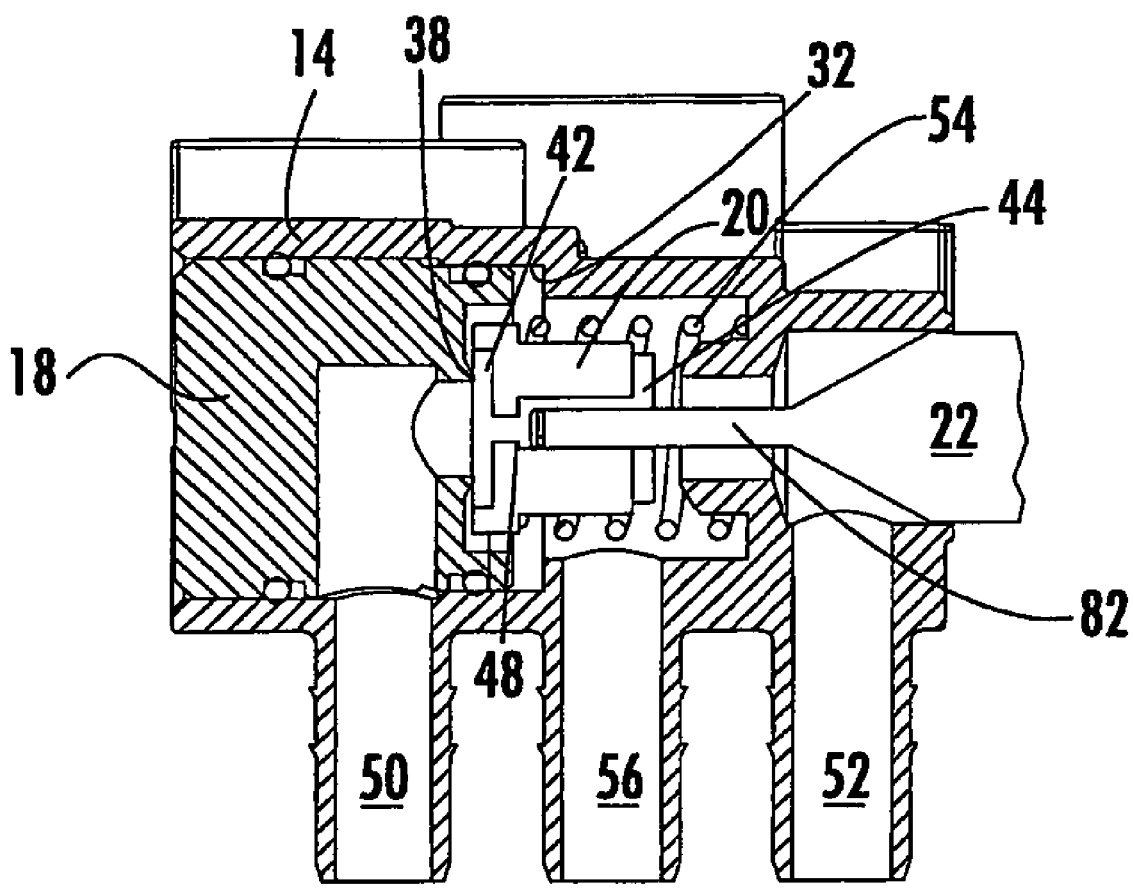
FIG. 17 is another view of the valve assembly of FIG. 15 showing an end cap locked into position therein.

FIGS. 15-17 illustrate an alternative assembly method, which differs from the method noted above in that the assembly is performed with the armature 22 in an un-activated state. The plunger 20 with first and second seals 42 and 44 and spring 54 is installed directly to the operating rod 82 of the armature 22 that has already been assembled with the valve body 12. When the plunger 20 is inserted into the valve bore 32, the armature 22 is forced into the "activated" (i.e. coil energized) position. During the installation of the plunger 20, a regulated air source (not shown) is connected to the second (i.e. normally open) port 52. The plunger 20 with first and second seals 42 and 44 and spring 54 is then inserted in place to what will be the activated position and assembled to the point that the airflow through the second port 52 is completely stopped. At this point, the second seal 44 is pressed against the second valve seat 40 to a level that inhibits a set airflow. Depending on the planned valve configuration, the plunger 20 is inserted some amount further to force a certain percentage of compression against the second seal 44. This allows for future compression set that may be seen in the resilient second seal 44.

Next, the end cap 18, which contains the first (normally closed) valve seat 38, is inserted to a particular depth that is known to be less than its optimal position range, as shown in FIG. 16. A regulated air source (not shown) is connected to the second (normally open) port 52 while a calibrated flow meter (also not shown) is connected to the common port 56. The coil 26 is deactivated, allowing the spring 54 to force the armature 22 to its un-activated position. The second port 52 is opened creating a clear flowpath to common port 56 thus allowing airflow through the valve assembly 10 that is measured by the flow meter.

The end cap 18 is then inserted further into position while the airflow is being monitored, as shown in FIG. 17. Once a target airflow for the desired configuration is achieved, the end cap 18 is permanently secured in place by a known method, for example by using fasteners, adhesives, staking, crimping, or the like.

The ability to monitor the fluidic performance of the valve assembly 10 during the assembly process gives an additional capability to tune the valve assembly 10 to a specific performance point during the production assembly without having any components or operations added. This assembly procedure completely prevents the variance in the lengths of the valve body 12, armature 22, pole piece 24, plunger 20 with seals 42 and 44, and end cap 18 from affecting the fluidic performance of the final assembly. This method also overcomes the effects of wear on any tooling used to fabricate the various components such as injection molds or elastomer compression molds. Only the level of accuracy and repeatability of the equipment used to measure the fluidic parameters limit the repetitiveness of this method.

Utilizing the above-described features, it has been found that, at a given pressure point, the herein described valve assembly 10 allows about two times the fluidic flow, and requires only about half of the input power to actuate, than similar prior art valves.

A valve assembly including an integral solenoid has been disclosed. Various details of the invention may be changed without departing from its scope. Furthermore, the foregoing description of the preferred embodiments of the invention and the best mode for practicing the invention are provided for the purpose of illustration only and not for the purpose of limitation.

What is claimed is:
1. A method of assembling a valve, comprising:
   providing a valve housing having a bore therein, and at least two ports in flow communication with said bore;
   providing at least one sealing element receivable in said bore, wherein the position of said element affects the flow through said at least two ports;
   flowing air through a first port;
   inserting said sealing element into said bore while monitoring said fluid flow through said first port;

stopping said sealing element when said flow through said first port is terminated;
securing said sealing element;
creating a second flow of fluid through a second port;
inserting an end cap into said bore and moving said end cap in the direction of said sealing element while monitoring a flow rate of said second flow;
stopping said end cap at a position where said second flow equals a predetermined value; and
securing said end cap to said valve housing.

2. A method of assembling a valve, comprising:
providing a valve housing having:
   an open-ended bore;
   first, second, and third ports disposed in flow communication with said bore; and
   a first valve seat disposed between said second port and said third port;
providing an end cap adapted to be received in said bore and defining a second valve seat disposed between said first port and said third port;
providing an operating rod disposed in said bore and moveable between a first position adjacent said first valve seat, and a second position away from said first valve seat;
providing a plunger adapted to fit in said bore and be attached to said operating rod, said plunger having:
   a first seal adapted to engage said first valve seat; and
   a second seal adapted to engage said second valve seat;
moving said operating rod to said first position;
creating a first flow of fluid through said third port;
inserting said plunger into said bore and moving said plunger towards said first seat while monitoring a flow rate of said first flow;
stopping said plunger at a position where said first flow is terminated; securing said plunger to said operating rod;
creating a second flow of fluid through said first port;
inserting said end cap into said bore and moving said end cap towards said first seat while monitoring a flow rate of said second flow;
stopping said end cap at a position where said second flow equals a predetermined value; and
securing said end cap to said valve housing.

3. The method of claim 2 further comprising:
after stopping said plunger at a position where said first flow is terminated, continuing to move said plunger towards said seat until said first seal is compressed to a selected degree.

4. The method of claim 2 further comprising:
moving said plunger against said second valve seat;
creating a third flow of fluid through said second port;
inserting said end cap into said bore and moving said end cap towards said first seat while monitoring a flow rate of said third flow;
stopping said end cap at a position where said third flow equals a predetermined value; and
securing said end cap to said valve housing.

* * * * *